Dec. 12, 1961  R. W. ASTHEIMER ET AL  3,012,473
CONTRAST RADIOMETER WITH BACKGROUND ELIMINATION
Filed Jan. 4, 1960
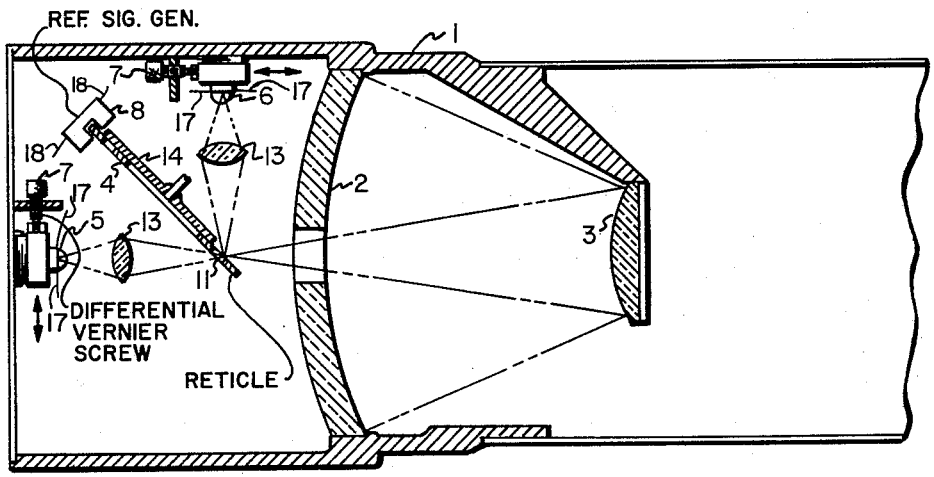
FIG. 1
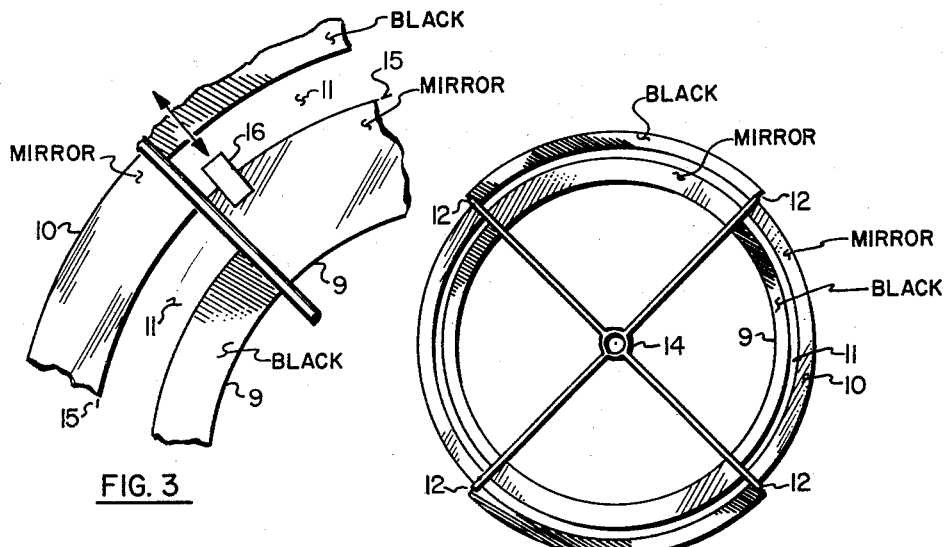
FIG. 3
FIG. 2
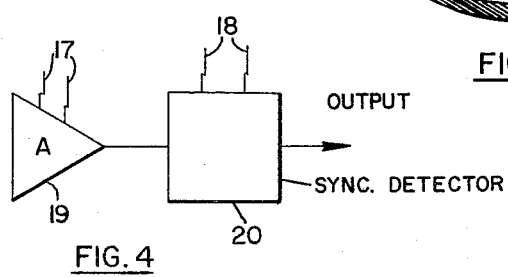
FIG. 4
INVENTORS
ROBERT W. ASTHEIMER
RICHARD F. LEFTWICH
BY
*Robert Ames Norton*
ATTORNEY United States Patent Office 3,012,473
Patented Dec. 12, 1961

3,012,473
CONTRAST RADIOMETER WITH BACKGROUND ELIMINATION
Robert W. Astheimer, Westport, Conn., and Richard F. Leftwich, Pound Ridge, N.Y., assignors to Barnes Engineering Company, Stamford, Conn., a corporation of Delaware
Filed Jan. 4, 1960, Ser. No. 269
8 Claims. (Cl. 88—23)

This invention relates to an improved contrast radiometer and more particularly to a reticle and detector combination for use therein.

The problem of measuring radiant emittance of a relatively small object or target against a large uniform background is an important one. The target may be anything which is hotter or colder than its background surroundings and may be stationary or be moving such as a jet airplane and the like. The difficulty arises from the fact that the background, although it may have a much lower radiant emittance, is so large that its total radiant flux encountered by a detector of finite size may be many times greater than that from the target even though the latter has a much higher radiant emittance. The present invention solves the problem by an effective cancellation of background signal and by its use background rejection as high as 10,000 to 1 or even higher may be secured.

It is an important advantage of the present invention that the random fluctuation of background radiation are also to a large extent cancelled or discriminated against. It is thus possible under favorable circumstances to measure the radiant emittance of a target where the latter is quite low provided, of course, that the radiant emittance of the background is still lower. Amplification can be at a maximum and is limited only by noise conditions in the amplification of the target signal itself. For example, measurements can be made of the radiant emittance of portions of a vessel or distant aircraft or other vehicles even though the target is very distant, and subtends a very small portion of the field of view of the instrument.

The present invention measures radiant emittance for any optical radiation, that is to say, one of wavelength sufficiently short to accurately obey optical laws, includes light, both visible and ultraviolet, and infrared radiations. The greatest single field of use is in connection with infrared radiations but the invention is in no sense limited thereto.

It is an advantage of the present invention that simultaneous measurement of radiant emittance in as many as four radiation bands may be made with a single piece of equipment with only small energy loss. Two bands can be measured with no loss in energy and four with a loss of only half of the energy. Other advantages of the present invention are compactness, ruggedness and the presence of only a single moving part.

Aiming of the device of the present invention may be effected simply manually or it may be rigidly connected to a tracker. It should be understood that the device of the present invention is not a tracker in itself but is a measuring instrument capable of measuring, with a high degree of accuracy, radiant emittance of a small target against a large background. Within operating limits the accuracy of the device of the present invention remains high and the inaccuracies in the ordinary kind of measurement of contrast where a small difference between large quantities often has to be detected is not present in the present invention and a much higher degree of accuracy is obtained than was hitherto possible with simple equipment.

The invention will be described in greater detail in conjunction with a typical infrared instrument and in connection with the drawings in which:

FIG. 1 is a horizontal section through a two channel radiometer;

FIG. 2 is a plan view on an enlarged scale of the surface of a reticle;

FIG. 3 is a diagrammatic representation of the image of the detector on the reticle, and FIG. 4 is a diagram of the electronic circuits.

In the device of the present invention a rugged, aimable housing is shown at 1 carrying conventional Cassegrain reflective optics, including a Cassegrain mirror 2, and secondary mirror 3, and a rotating and chopping reticle 4. The reticle is divided into quadrants and the radiant energy is alternately reflected by mirror surfaces onto a detector 6 and through open or transparent spaces onto another detector 5. The detectors are provided with micrometric positioning screws 7, the operation of which will be described below. Instead of conventional field lenses there are lenses 13 which image the detectors onto the plane of the rotating reticle. The detectors and the reference signal generator 8 are provided with output leads 16 and 17 respectively. Each detector is provided with electronic processing circuits which will be described in more detail below in conjunction with the description of FIG. 4.

The reticle also produces a reference or switching signal in the generator shown diagrammatically at 8. This signal generator may be of any conventional type, the one illustrated in FIGS. 1 and 2 being of conventional interrupted light beam type.

The face of the reticle which is divided into four quadrants is shown in FIG. 2. In each quadrant there is an inner sector 9 and an outer annular portion 10 separated by a transparent slot 11. Mechanical strength is provided by a spider 14 which is shown as having four thin arms. Alternating quadrants are displaced radially which displaces the slot 11 about a center line. The center line is shown in FIG. 3 at 15 and is defined by the outer edges of the two inner sectors and inner edges of the two outer annular portions. The outer annular portions 10 of the quadrants are of the same width producing four steps 12 which interrupt a light beam in the conventional signal generator 8 twice each revolution.

FIG. 3 illustrates diagrammatically the image 16 of a detector on the slot of the reticle. This image is movable radially by moving the detector by means of its positioning screw 7 (FIG. 1).

In the case of the detector 5 receiving transmitted light the image is centered on the center line 15 of the two staggered parts of the slot 11. In the case of the detector 6 which receives reflected light from the reticle the centering is on the same line which also defines the discontinuity between the mirrored portions of the reticle quadrants and the other portions which are preferably painted black and which do not reflect. The open slot is of course, also not a reflector. It is not necessary that the mirrored portion of each quadrant extend for any great distance radially. It is sufficient if it is somewhat in excess of half the radial dimension of the detector image. Looking at FIG. 2 it will be apparent that there is a reflecting zone running along the slot and constituting a reflecting band just as the slot constitutes a transmitting band for light passing directly through the reticle. It will be noted that since the two parts of the slot are staggered the resulting line of optical discontinuity between the transmitting and opaque signals is a line which extends in the direction that the reticle moves.

In the modification shown in FIG. 1 where there are two detectors these detectors are preferably responsive to two different wavelength bands of the radiation. For example, one detector might be a lead sulfide detector and the other a thermistor bolometer. In each case the operation of each detector is independent and is connected to its own electronic processing circuits. The circuits are of known design and as their details form no part of the present invention they are not shown and will be described only qualitatively. FIG. 4 shows the processing circuits for one detector. The detector output leads 17 connect to the input of an A.C. amplifier 19. The output of the amplifier contains the signals from both detector halves. These signals are, of course, in opposite phase because of the alternate transmission through the staggered regions of the reticle which has been described above. The output is introduced into a synchronous detector 20 of standard design. The detector is supplied with a reference signal from the reference signal generator 8 through the wires 18. This results in the two signals in different phases being opposed so that the output of the synchronous detector contains a signal which is proportional to the difference between the two signals. In the notation which will be used below in describing the operation of the device mathematically the output of the synchronous detector corresponds to S.

The operation of the device will be apparent by considering the events which occur when the device is normally operated. First, the device is directed against a uniform background and the detectors adjusted by screws 7 until there is no signal output. It should be noted that this preliminary nulling or calibration also corrects for any nonuniformity of response of detector surface. For example, considering FIG. 3, let us suppose that one end of the detector had a greater sensitivity than the other end. It would still be possible to cancel out background but the detector would not be symmetrically imaged. Since it is the electrical output signal with which one is concerned and not the position of a detector element it is a marked operational advantage of the present invention that the adjustment of the image of the detector on the reticle cancels out all effects from the uniform background to a very high degree without requiring an absolutely uniform detector surface.

After preliminary calibration or nulling the instrument is aimed at a target in a background. The portion of the detector image illuminated by the target is very much smaller than that illuminated by the background. As the reticle rotates, at a speed suitable for detector response and amplifier characteristics, the signal comes alternately from one half of the detector and the other as the reticle quadrants pass. If there is uniform response from each half of the detector, as in the nulling or calibrating operation when the instrument is directed at a more or less uniform background, the signals from the two halves of the detector are equal and the net signal is therefore D.C. except for very brief transient as a dividing line between two quadrants passes the edge of the detector image. Since the amplifier is for A.C. and normally contains circuit components having fairly long time constants compared to transients, the D.C. signal put out by the two halves of the detectors will not be amplified.

When the instrument is then turned on the target, the image of the target, which is comparatively small, in normal use will be practically all of the time on only one half of the detector image. Therefore a signal from this half will be greater or less than the signal from the other half depending on whether the target has a higher or lower relative radiant emittance than the background. The amplifier input receives then first one signal and then another which are different and as a result there is an A.C. component at the reticle chopping frequency equal to the difference between the two signals. Since the amplifier is an A.C. amplifier passing a band of frequencies centered around the reticle chopping frequency it will respond to this A.C. signal component and amplify it. On the other hand, the amplifier is insensitive to the substantially D.C. signal when the two halves of the detector are putting out the same signal and therefore there is a cancellation of these signals in the amplifier input or rather a subtraction of one signal from the other because it is only this A.C. differential signal to which the amplifier responds. A surprising result is that the accuracy of the amplifier and processing circuits in measuring target radiant flux is unaffected by relative target and background sizes even though the total radiant flux from a large background may be enormously greater than that from the small target. The important result of the present invention may be shown mathematically as follows using the following definitions:

S is total net output signal from the electronic circuits.

$S_1$ is the signal from that half of the detector which receives both background and target radiation.

$S_2$ is the signal from the other half of the detector receiving background radiation only.

$A$ = area of target image on the detector.

$N_B$ is radiance from the background $N_T$ radiance from the tarket and K is the factor by which the total area of one-half the detector exceeds the area irradiated by the target. It should be noted that the half of the detector which is irradiated by the target will have background irradiation diminished by the target size which, of course, obscures part of the background. The mathematics are as follows:

$S_1 = (K-1)N_B A + N_T A$
$S_2 = K N_B A$
$S = S_1 - S_2 = (K-1)N_B A + N_T A - K N_B A = A(N_T - N_B)$

It will be seen that the effect of the relatively enormous portion of the detector irradiated by the background is completely cancelled out and the final signal is simply the difference between target flux and the background flux from the same area regardless of target size within the limits of accuracy of the device. This accuracy depends only on the relative radiance of background and target. The error can be shown as follows:

$$\text{Fractional error} = 1 - \frac{S}{AN_T} = 1 - \frac{AN_T - AN_B}{AN_T} = \frac{N_B}{N_T} \times 100$$

It will be noted that the error in measurement depends only on the relative target and background radiance and is not a function of the size of the target relative to the size of the field of view. Since in practice targets will often have a much higher radiance than the background, the target radiance can be measured with an error of only a few percent.

From the above description of the instrument of the present invention it will be apparent that the background cancellation is effected in the input of the amplifier. In simple instruments it is possible to use the device without a reference generator switching signal. However the signal generator described above and signals from it improve the operation of the instrument and permit obtaining additional information. The preferred embodiment of the invention therefore includes the generation of switching signals.

As was described above, the amplifier output is of A.C. difference signal between the signals from the two halves of the detector, and from a consideration of the output alone, the only information obtained is a measurement of the relative radiant emittance of target and background. No information is given on either of two, sometimes important facts, namely whether the target has a greater or smaller relative radiant emittance than the background, i.e., in an infrared operation whether the target is hotter or colder than the background, and there is no information with respect to which detector half contains the target image. When switching signals operate gates or switches in the electronic circuits, the output signals to the two detector halves cease to be scalar electrical units, and can be given a direction or sign. In other words the phase of the output signal from the electronic circuits can be determined. Once this is detectably present in the electronic circuit output it is possible to determine relative emittances if the position of the target is known or position if relative emittance is known. If it is known that the target has a greater or less radiant emittance than the background, then the signal gives information concerning which detector half carries the target image. Conversely, and in practice, ordinarily the more important situation, is where the position of the target is known and then the phase of the signal tells whether the target has greater or less radiant emittance than the background. This second situation normally occurs when the present instrument is used in connection with a tracker which aims the instrument so that the target is on a predetermined detector half. Then it can be determined at a glance from the electronic signal readout whether a target is hotter or colder than the background which is often an important consideration. To use a rather crude and homely illustration if the target is picked up at sea at night it would be desirable to know whether it is an iceberg or a ship.

Careful consideration of the description of the instrument will indicate that there will be no measurement if the small target image is exactly bisected by the line of discontinuity of optical characteristics of the reticle. This is not a problem of any consequence. If the instrument is used in connection with an aiming device such as a tracker the two instruments are so connected together that the target image is maintained always on one predetermined half of the detector. Even when manual aiming is used a slight movement will swing the target onto one or other halves of the detector and the instrument will operate. Of course where separate sighting telescopes are added to the instrument in the conventional manner the same slight displacement can be provided by the initial alignment of the telescope.

The drawings illustrate a device in which two detectors for two different wave bands are operated simultaneously. This number can be multiplied by two by providing conventional beam splitters in either beam, each beam, therefore, serving two detectors instead of one. As has been pointed out above the use of beam splitters halves the energy but in the case of targets of satisfactorily high radiance it does permit a simultaneous measurement of this radiance in a larger number of wavelength bands.

When operating in the far infrared the reticle is normally made entirely of metal and the slot has to be open. In the visible light region and the near infrared satisfactory transparent material is available. For instance, the recticle can be made of a suitable glass, the slot being plain glass separated by other sectors of mirror or blackening. In such a case the spider 14 would not be necessary, and where it is not needed it may be dispensed with as the spider arms, even though quite narrow, do interrupt the radiation. However, this interruption is so small compared to the large quadrants that it does not adversely affect the operation of the machine when electronics incorporate low pass circuits or integrating elements as they often will. The effect of any momentary interruption is eliminated electronically.

The recticle is shown as having four quadrants and this is normally the most satisfactory design. However, the invention is not limited to it and reticles with larger numbers of sectors may be employed. In general, however, they do not present advantages over the quadrantal reticle shown in the drawings and this latter design is, therefore, preferred.

It will be apparent from the description above that the field of view is determined by the size of the detector. Different fields of view can be obtained with interchangeable detectors of different sizes and for some uses this added versatility is advantageous. The fact that the detector size defines the field of view has a further advantage. The focal length of the optics becomes relatively unimportant and so optics of the best practical focal length may be chosen without adversely affecting the operation of the device. This permits the production of compact devices.

In the drawings reflective optics have been shown. In the infrared these optics present many advantages. They are achromatic and can be produced in large sizes without the excessive cost involved in large refractive optics. Thus, for example, in a typical practical radiometer, according to the present invention, the Cassegrain mirror may have a diameter of 12 inches or more which permits operating at very low energy levels which is sometimes important where it is desired to obtain measurements of radiance or contrast in a very narrow avelength band with correspondingly small amounts of energy. More importantly the sensitive optics permit measurement of very distant targets particularly when the flux received is small. However, the invention is in no sense limited to use of reflective optics and refractive optics may be employed, for instance, in the infrared, lenses may be made of germanium. In fact the design of the optics really forms no essential part of the present invention and standard radiometer design may be employed. This is a practical manufacturing advantage and permits using many elements of standard design.

The rate of rotation of the reticle is in no way critical and is determined merely by the time constant of the detectors and consideration of amplifiers and switching means. Moderate speeds giving interruptions of from 20 to 100 cps. may be used. Even with fast detectors, for example photoelectric detectors of short time constants, there is an advantage in operating the reticle at moderate speeds within the range of high speed synchronous switches which constitute a very rugged and simple switching means. The invention, however, is not limited to any particular reticle rotational speeds which confers on the invention a desirable additional versatility.

When a device is desired with a single detector it is not necessary to use reflecting mirror coatings on any portion of the article and it may be positioned at right angles to the optic axis instead of at 45° as shown. This makes for a somewhat simpler and more rugged design at the expense of the number of wavelength bands in which simultaneous radiant emittance measurements can be effected.

In the descriptions of the drawings in which multiple detectors are described and the reticle, therefore, is positioned at 45° to the incoming optical beam it is necessary to use relay lenses to produce sharp images of the detectors in the zones of discontinuity because, from the standpoint of the beams from the reticle to the detector, the reticle is not in a single focal plane. When a single detector only is used as described above, the reticle plane can be at right angles to the single light beam passing through the zone of discontinuity and much simpler optical means may be used so that the light from the different zones in the reticle strikes the different halves of the detector. In this case field lenses may be used and detector movement is not required. However, the effect is still the same as if the detector were imaged on the zone of discontinuity. With field lenses the reticle determines the field of view. Field lenses are sometimes not considered as imaging optics though in the present instance they perform the same function, and are included in the claims under the term "means for imaging said detector on the annular zone of discontinuity of the reticle."

We claim:

1. A contrast radiometer comprising in combination and in optical alignment radiation gathering optics producing a focused beam, a moving, chopping reticle having at least one periodically alternating zone parallel to the reticle motion said zone having periodically staggered regions of optical transmission and optical reflection characteristics disposed symmetrically about a line of discontinuity in said zone which is annular in shape concentric with the center of rotation of the reticle, at least one finite area detector for optical radiations, means for imaging said detector on the line of discontinuity of the reticle, so that the detector image, one on each side, is bisected by the line of discontinuity, means for rotating the reticle at a predetermined rate, A.C. amplifying means and means for impressing the signal from the two portions of the detector image onto the A.C. amplifier input, whereby uniform background radiation striking the detector is cancelled out.

2. A radiometer according to claim 1 in which an annular zone of sharply varying reflectance is positioned adjacent to but radially displaced from the zone of optical transmission discontinuity, a second detector, means for imaging said second detector on the zone of reflective discontinuity, means for positioning said second detector symmetrically with respect to the line of discontinuity of said zone and separate electronic means receiving the output from said second detector.

3. A radiometer according to claim 1 in which the reticle is provided with four quadrantal sectors each sector having an annular zone of high transparency for the optical radiation used, the annular zones being alternately radially displaced about the circle formed by the inner edge of one annulus and the outer edge of the other.

4. A radiometer according to claim 1 in which reference signal generating means are provided actuated by the reticle and means in the amplifier actuated by said reference signal for distinguishing in the output signal between the signals from the two halves of the detectors.

5. A radiometer according to claim 4 in which the reference signal generator is of the interrupted beam type and the outer periphery of the reticle is provided with an interrupting portion in at least two opposite sectors.

6. A radiometer according to claim 2 in which the reference signal generator is of the interrupted beam type and the outer periphery of the reticle is provided with an interrupting portion in at least two opposite sectors.

7. A radiometer according to claim 3 in which reference signal generating means are provided actuated by the reticle and means in the amplifier actuated by said reference signal for distinguishing in the output signal between the signals from the two halves of the detectors.

8. A radiometer according to claim 7 in which the reference signal generator is of the interrupted beam type and the outer periphery of the reticle is provided with an interrupting portion in at least two opposite sectors.

References Cited in the file of this patent

UNITED STATES PATENTS

| | | |
|---|---|---|
| 1,919,182 | Fitz Gerald | July 18, 1933 |
| 2,798,961 | Wormser | July 9, 1957 |